United States Patent [19]

Eguchi et al.

[11] 4,359,685

[45] Nov. 16, 1982

[54] MAGNETO-RESISTANCE TYPE CONTACTLESS ROTATIONAL ANGLE DETECTING APPARATUS

[75] Inventors: Osamu Eguchi, Anjo; Mitsutoshi Hattori, Okazaki, both of Japan

[73] Assignee: Nippondenso Co., Ltd., Kariya, Japan

[21] Appl. No.: 82,423

[22] Filed: Oct. 5, 1979

[30] Foreign Application Priority Data

Oct. 10, 1978 [JP] Japan .................................. 53/124403
May 16, 1979 [JP] Japan .................................. 54/60848

[51] Int. Cl.³ ........................... G01B 7/14; G01P 3/48
[52] U.S. Cl. ...................................... 324/208; 324/174
[58] Field of Search ............... 324/208, 235, 243, 251, 324/252, 173, 174; 340/671, 670; 318/653; 123/414, 617; 307/309

[56] References Cited

U.S. PATENT DOCUMENTS 3,636,767  1/1972  Duffy .................................. 324/174
3,818,326  6/1974  Masuda et al. ...................... 324/208
3,846,697  11/1974  Cila et al. .......................... 324/174

Primary Examiner—Gerard R. Strecker
Assistant Examiner—Walter E. Snow
Attorney, Agent, or Firm—Cushman, Darby & Cushman

[57] ABSTRACT

A rotational angle detecting apparatus employs a bridge circuit of four magneto-resistance elements arranged in a plane and placed in a fixed magnetic field so that the plane of the bridge circuit is parallel to the direction of the magnetic field and is rotatable around the axis perpendicular to the plane. One pair of diagonally disposed magneto-resistance elements further includes resistors respectively such that the direction of the potential difference obtained at one pair of opposite junctions of the bridge circuit is always constant although the magnitude thereof is varied depending on the direction of the magnetic field.

The output potential difference from the bridge circuit is amplified by a D.C. amplifier including an operational amplifier and a transistor to deliver an output voltage across a collector resistor of the transistor.

4 Claims, 6 Drawing Figures

MAGNETO-RESISTANCE TYPE CONTACTLESS ROTATIONAL ANGLE DETECTING APPARATUS

The present invention relates to a rotational angle detecting apparatus for converting a mechanical angular displacement into an electric quantity in a noncontact manner by utilizing magneto-resistance elements whose resistance value varies in dependence on the direction of a magnetic field.

With many different types of control systems recently used in automobiles, there has been a need for an improved rotational angle detecting apparatus for detecting for example the opening of an intake air flow measuring valve or throttle valve, that is, apparatus having no mechanical electric contact structure and hence involving no problem of contact wear and generating noise.

As a possible means of meeting this need, it is known to use a detecting means comprising magneto-resistance elements of the thin-film nickel-cobalt magnetic alloy type which are connected in bridge form. In the detecting means, the four magneto-resistance elements whose resistance value varies in dependence on the direction of the applied magnetic field are connected in bridge form, so that when a current is supplied to the bridge and a magnetic field having a direction of an angle $\theta$ is applied to the bridge, two voltage signals which are different in phase by 90° and given by an output function $Y = A \cos 2\theta + B$ (where A and B are constants) are generated at the two signal output terminals. If the direction $\theta$ of the magnetic field applied to the detecting means is changed in response to the rotational angle of a body, a voltage signal corresponding to the rotational angle will be produced. By using a bridge construction to obtain the difference between two voltage signals, it is possible to produce a detection signal whose amplitude varies greatly in response to a variation in the rotational angle.

The detection signal produced by the detecting means is not used as such and the usual practice is to use the detecting means in combination with a signal amplifying circuit having an adjusting function to correct for variations in the resistance value of the magneto-resistance elements. If a differential amplifier circuit comprising an operational amplifier, input and feedback resistors, etc., is used for the signal amplifying circuit, it will be extremely difficult to make the required circuit adjustment for changing the amplification factor or correcting for variations in the resistance value of the magneto-resistance elements.

In view of this background, it is the object of the invention to provide a rotational angle detecting apparatus employing detecting means consisting of magneto-resistance elements arranged in the form of a bridge, whereby the detection signal produced by the detecting means can be amplified sufficiently and the amplified output can be easily corrected for variations in the characteristic of the magneto-resistance elements.

Thus the apparatus of this invention has among its great advantages the fact that the positive and negative directions of the voltage signals produced at two signal output terminals can be fixed without deteriorating the output characteristic of a magneto-resistance unit by the magneto-resistance unit consisting of magneto-resistance elements arranged in bridge form to detect the direction of a magnetic field as well as a pair of resistors connected in the bridge in a diagonal relation, and consequently it is possible to easily correct the output for variations in the characteristic of the magneto-resistance elements by for example using the magneto-resistance unit in combination with a D.C. amplifier circuit whose amplification factor can be varied by simply varying one of the resistors.

Another advantage of the invention is that by replacing the D.C. amplifier circuit with another D.C. amplifier circuit capable of separately varying the amplification gain and the zero point by selectively varying the resistors, it is possible to separately and easily accomplish the adjustment of output and the adjustment of zero point.

The preferred embodiments of the invention will now be described with reference to the accompanying drawings, in which.

Figure 1:
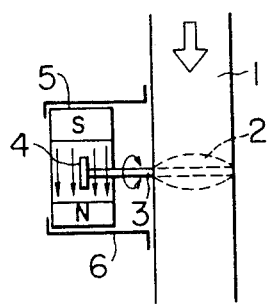
FIG. 1 is a schematic diagram showing, by way of example, a valve opening measuring system incorporating a rotational angle detecting apparatus according to the invention.

Referring now to FIG. 1, numeral 1 designates for example a pipe through which air is supplied to an internal combustion engine (not shown), and 2 an intake air flow measuring valve or throttle valve which is rotatably mounted on a shaft in the pipe 1. Numeral 3 designates the rotary shaft which is made integral with the valve 2, and a magneto-resistance unit 4 is mounted on the tip of the shaft 3. Numeral 5 designates a permanent magnet for applying a fixed magnetic field to the magneto-resistance unit 4 and the magnet 5 is fixedly attached to the pipe 1 with a supporting member 6.

Figure 2:
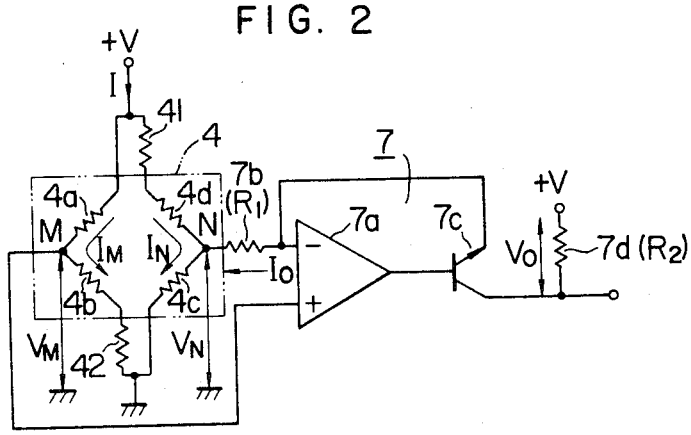
FIG. 2 is a wiring diagram showing an embodiment of the rotational angle detecting apparatus according to the invention.

The magneto-resistance unit 4 is of the thin-film nickel-cobalt magnetic alloy type and it comprises four magneto-resistance elements which are arranged in bridge form to constitute a six-terminal unit as shown in FIG. 2. Numerals 41 and 42 designate resistors for positively unbalancing the potential differential between two signal output terminals M and N of the bridge, and field direction detecting means is formed by the resistors 41 and 42 and the magneto-resistance unit 4. The resistors 41 and 42 may be incorporated as an integral part of the magneto-resistance unit 4.

Numeral 7 designates a D.C. amplifier circuit for amplifying the potential difference between the signal output terminals M and N of the field direction detecting means and in this embodiment it comprises a voltage-current converter circuit including an operational amplifier 7a, a resistor 7b and a transistor 7c and a current-voltage converting resistor 7d. In the amplifier circuit 7, the terminal M is connected to the noninverting input terminal (+) of the operational amplifier 7a and the terminal N is connected to the inverting input terminal (−) of the amplifier 7a through the resistor 7b so that potential ($V_M - V_N$) is applied across the resistor 7b. If the resistance value of the resistor 7b is represented as $R_1$, then the current $I_O$ flowing in the resistor 7b is given by $I_O = (V_M - V_N)/R_1$. Since in this embodiment the resistors 41 and 42 establish $V_M \geq V_N$, the current $I_O$ always flows from the inverting input terminal of the operational amplifier 7a to the signal output terminal N of the magneto-resistance unit 4. Generally the input impedance of an operational amplifier is high and consequently the current $I_O$ is practically supplied entirely through the collector-emitter section of the NPN transistor 7c. In this case, by increasing the current amplification factor of the NPN transistor 7c, the voltage drop across the collector resistor 7d of the NPN transistor 7c can be regulated by the current $I_O$ and a resistance value $R_2$ of the collector resistor 7d.

In other words, the output voltage $V_O$ of the amplifier circuit 7 is given by $$V_O = R_2 \times (V_M - V_N)/R_1$$

Consequently, in order to adjust the amplification factor for the potential difference ($V_M - V_N$) or to correct for variations in the characteristic of the magneto-resistance elements, it is only necessary to adjust the resistor 7b($R_1$) or the resistor 7d($R_2$) as will be seen from the above equation. If it is desired to positively eliminate the current flowing from the terminal N to the amplifier 7a, the voltage generated at the terminal N should preferably be applied to the amplifier 7a through the resistor 7b and a voltage follower circuit which is not shown.

Figure 3:
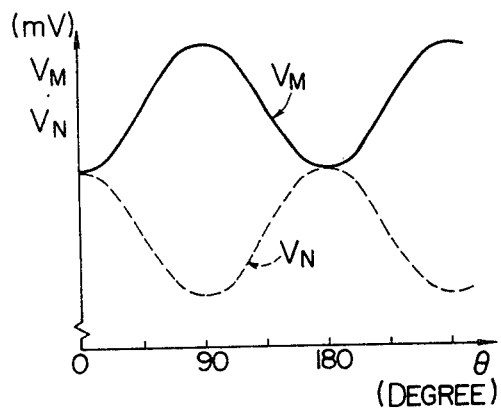
FIG. 3 is a characteristic diagram showing the relationship between the rotational angle and the output voltage of the detecting means.

With the construction described above, when a fixed voltage V is applied to the field direction detecting means to supply a current I thereto, output voltages $V_M$ and $V_N$ corresponding to the direction $\theta$ of the magnetic field applied to the magneto-resistance unit 4 are respectively generated with a phase difference of 90° therebetween at the signal output terminals M and N. In this case, since the resistors 41 and 42 are connected in a diagonal relation with the respective current paths of the bridge, their resistance values are selected relatively large and consequently the relation between the output voltages $V_M$ and $V_N$ is always maintained $V_M \geq V_N$ as shown in FIG. 3.

In this case, while many different methods are available for unbalancing the output voltages $V_M$ and $V_N$ of the magneto-resistance unit 4, in order to maintain the output characteristic of the magneto-resistance unit or the relation $Y = A\cos 2\theta + B$ (where A and B are constants), it is essential that the amount of unbalance between the output voltages $V_M$ and $V_N$ has a certain magnitude and that the currents $I_M$ and $I_N$ flowing respectively in the two current paths of the bridge are made practically equal to each other and, consequently the resistors 41 and 42 having practically the same resistance value must be connected in diagonal relation with the bridge as shown in FIG. 2.

Figure 4:
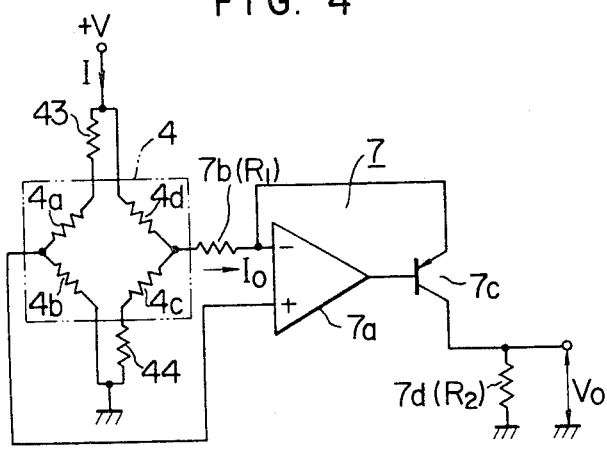
FIG. 4 is a wiring diagram showing another embodiment of the rotational angle detecting apparatus according to the invention.

While, in the above-described embodiment, the resistors 41 and 42 are connected so that $V_M \geq V_N$, resistors 43 and 44 having practically the same resistance value may be connected in the reverse diagonal relation as shown in FIG. 4 so that $V_M \leq V_N$. In the latter case, the same functions as in the case of the above-described embodiment can be ensured by using a PNP transistor for the transistor 7c and connecting the resistor 7d between the collector of the transistor 7c and the ground. The transistor 7c may also be replaced with Darlington connected transistors so as to increase the current amplification factor. Further, while, in the above-described embodiment, the magneto-resistance unit 4 is rotated within the magnetic field, it is possible to rotatably mount the field producing magnet 5 and fixedly mount the magneto-resistance unit 4 in place.

Figure 5:
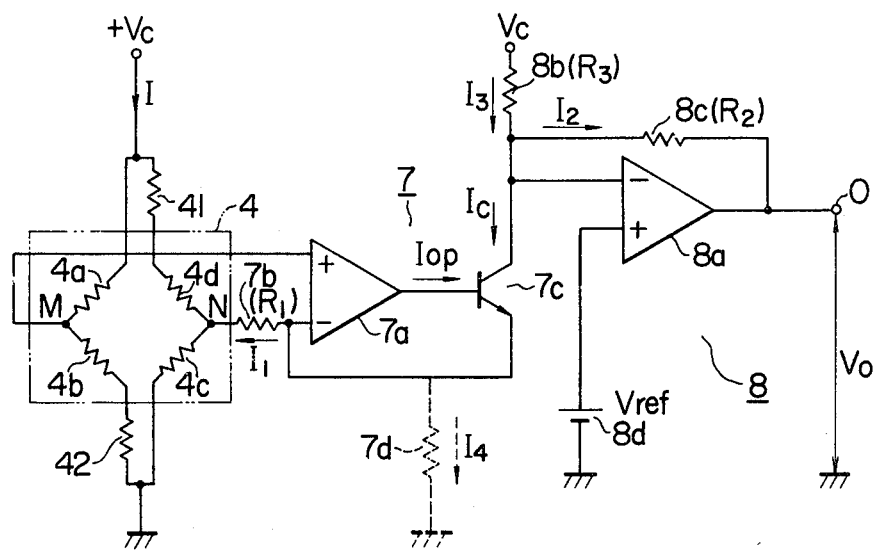
FIG. 5 is a wiring diagram showing still another embodiment of the rotational angle detecting apparatus according to the invention.

Referring now to FIG. 5 there is illustrated another embodiment of the invention which differs from the embodiment of FIG. 2 in that the adjustment of amplification gain of the signal amplifier circuit and the adjustment of the zero point (the so-called offset point) for the detection signal from the detecting means can be accomplished separately and easily.

A signal amplifying circuit for amplifying the potential difference between the signal output terminals M and N of a magneto-resistance unit 4 comprises a voltage-current converter circuit 7 including an operational amplifier 7a, a resistor 7b an an NPN transistor 7c and a current-voltage converter circuit 8 including an operational amplifier 8a, resistors 8b and 8c and a reference voltage source 8d. In the voltage-current converter circuit 7, the terminal M is connected to the noninverting input terminal (+) of the amplifier 7a, the terminal N is connected to the inverting input terminal (−) of the amplifier 7a through the resistor 7b and the voltage ($V_M - V_N$) is applied across the resistor 7b. Since the amplifier 7a makes the potentials at the inverting and non-inverting input terminals (−) and (+) practically equal to each other, the current $I_1$ flowing through the resistor 7b is proportional to the differential voltage between the signal output terminals of the magneto-resistor unit 4 and consequently if the resistance value of the resistor 7b is represented as $R_1$, then the current $I_1$ is given $$I_1 = (V_M - V_N)/R_1 \tag{1}$$

In this embodiment the resistors 41 and 42 establish $V_M \geq V_N$ and consequently the current $I_1$ always flows from the inverting input terminal (−) of the operational amplifier 7a to the signal output terminal N of the magneto-resistance unit 4. Generally, the operational amplifier has a high input impedance and consequently the current $I_1$ is supplied almost entirely through the collector-emitter section of the NPN transistor 7c. Thus, if the current amplification factor of the NPN transistor 7c is selected large (this may be on the order of the amplification factor 50 to 100 of the ordinary transistor), since the base current $I_{OP}$ of the transistor 7c is much smaller than the collector current $I_C$, the current $I_1$ is given by $$I_1 \doteq I_C \tag{2}$$

On the other hand, the inverting input terminal (−) of the operational amplifier 8a of the current-voltage converter circuit 8 is connected to the collector of the NPN transistor 7c and the reference voltage source 8d is connected to the noninverting input terminal (+) to apply a fixed reference voltage $V_{ref}$. Since the potentials at the inverting and noninverting input terminals (−) and (+) of the amplifier 8a are practically equal to each other, if the resistance value of the resistor 8c is represented as $R_2$, then the output voltage $V_O$ is given by $$V_O = V_{ref} - R_2 \times I_2 \tag{3}$$

In this case, the current $I_2$ flowing in the feedback resistor 8c is supplied through the collector resistor 8b and the current $I_2$ has the following relation with the collector current $I_C$ and the current $I_3$ flowing through the collector resistor 8b $$I_2 = I_3 - I_C \quad (4)$$

Thus, by modifying the equation (4) according to the equations (1) and (2), the current $I_2$ is given by $$I_2 = (V_C - V_{ref})/R_3 - (V_M - V_N)/R_1 \quad (5)$$

Here, $R_3$ represents the resistance value of the resistor 8b. As a result, by substituting the equation (5) in the equation (3), the output voltage $V_O$ is given by $$V_O = (V_M - V_N) \cdot R_2/R_1 + V_{ref} - (V_C - V_{ref}) \cdot R_2/R_3 \quad (6)$$

As will be seen from the equation (6), if the resistance value $R_2$ of the resistor 8c is fixed, the amplification gain of the output voltage $V_O$ with respect to the output voltage signal $V_M - V_N$ of the bridge will be determined by the resistance value $R_1$ of the resistor 7b and the zero point (the offset) will be determined by the resistance value $R_3$ of the resistor 8b. The zero point will also be determined by the reference voltage $V_{ref}$. As a result, the amplification gain can be adjusted by varying the value of the resistor 7b and the zero point can be adjusted by varying the value of the resistor 8b or the reference voltage $V_{ref}$, thus adjusting them separately. Where the reference voltage $V_{ref}$ is obtained by dividing the fixed voltage $V_C$ through two voltage dividing resistors (not shown), the zero point can be adjusted by varying the value of at least one of the resistors.

Where it is desired to positively eliminate the flow of current from the terminal N to the amplifier 7a, the voltage signal generated at the terminal N should preferably be applied to the amplifier 7a through the resistor 7b and a voltage follower circuit which is not shown.

In order that the magneto-resistance unit and the amplifying circuit may be temperature-compensated, a resistor 7d which is shown by a dotted line may be connected between the collector of the transistor 7c and the ground. In this way, the voltage across the resistor 7d will become practically equal to the voltage signal $V_M$ at the signal output terminal M and consequently the current $I_4$ flowing in the resistor 7d will be varied, along with the current $I_1$ flowing in the resistor 7b, in response to a change in the voltage signal M. This variation of the current $I_4$ is applied as a component of the current $I_C$ and an increase in the current $I_4$ acts in a direction to decrease the current $I_2$ and hence to increase the output voltage $V_O$ as will be seen from the equation (4). Consequently, by suitably selecting the resistance value of the resistor 7d, when the voltage signal $V_M$ is increased, for example, in accordance with the ambient temperature, the current $I_4$ flowing in the resistor 7d is increased correspondingly so as to cancel and prevent the change from resulting in a change in the current $I_2$.

Figure 6:
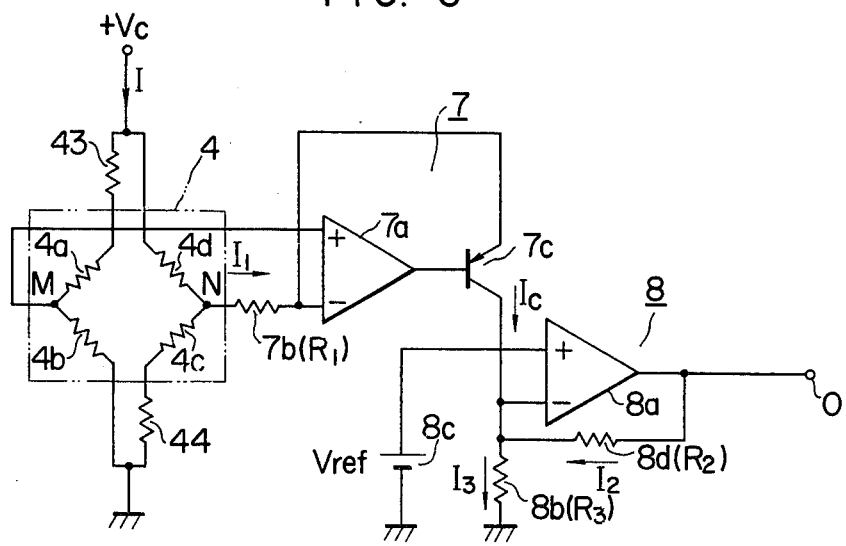
FIG. 6 is a wiring diagram showing still another embodiment of the rotational angle detecting apparatus according to the invention.

While, in the above-described embodiment, the resistors 41 and 42 are connected to that $V_M \geq V_N$, if resistors 43 and 44 which are substantially equal in resistance value are connected in the reverse diagonal relation as shown in FIG. 6 so that $V_M < V_N$, the same functions as in the case of the above-described embodiment will be ensured by using a PNP transistor for the transistor 7c and by connecting the resistor 8b between the collector of the transistor 7c and the ground. Also the transistor 7c may be replaced with Darlington connected transistors to increase the current amplification factor.

While, in the above-described embodiment, the magneto-resistance unit 4 is rotated within the magnetic field, it is possible to rotatably mount the field producing magnet 5 and fixedly mount the magneto-resistance unit 4 in place.

We claim:

1. An apparatus for detecting a rotational angle of a rotatable body comprising:

an electric power source;

a magnet for producing a fixed magnetic field and a supporting member fixedly supporting said magnet;

a bridge circuit placed in said fixed magnetic field and having a first arm, a second arm having one end connected in series with said first arm, a third arm and a fourth arm having one end connected in series with said third arm, a junction point between said first arm and said third arm and a junction point between said second arm and said fourth arm being connected across said electric power source, each of said arms including a magneto-resistance element which varies the electric resistance in accordance with the direction of said magnetic field, and said first and fourth arms further including respective resistors having electric resistances which keep one voltage signal developed across said fourth arm larger than the other voltage signal developed across said second arm;

a voltage-current converter connected to said bridge circuit for producing an electric current proportional to the difference between said one and the other voltage signals;

a current-voltage converter connected to said voltage-current converter for producing an output voltage signal proportional to said electric current; and means for rotating said bridge circuit in synchronized relation with said rotatable body.

2. An apparatus for detecting a rotational angle of a rotatable body according to claim 1, wherein said voltage-current converter comprises an operational amplifier having two input terminals, a resistor and a transistor, one of said two input terminals being connected through said resistor to a junction point between said first and said second arm to receive said other voltage signal developed across said second arm, the other of said two input terminals being connected to a junction point between said third arm and said fourth arm to receive said one voltage signal developed across said fourth arm, said transistor having a base and an emitter respectively connected to an output terminal and said one input terminal of said operational amplifier, and wherein said current-voltage converter comprises a resistor connected to a collector of said transistor to provide an output voltage.

3. An apparatus for detecting a rotational angle according to claim 1;

wherein said voltage-current converter comprises an operational amplifier having two input terminals, a resistor and a transistor, one of said two input terminals being connected through said resistor to junction point between said first and said second arm to receive said other voltage signal developed across said second arm, the other of said two input terminals being connected to a junction point between said third arm and said fourth arm to receive said one voltage signal developed across said fourth arm, said transistor having a base and an emitter respectively connected to an output terminal and said one input terminal of said operational amplifier, and wherein said current-voltage converter comprises a further operational amplifier, a resistor connected between the collector of said transistor and a constant voltage level, and a resistor connected in a negative feedback circuit of said further operational amplifier, said further operational amplifier having two input terminals respectively connected to the collector of said transistor and a reference voltage source.

4. An apparatus for detecting a rotational angle of a rotatable body comprising:

a permanent magnet fixed in position to produce a fixed magnetic field;

a magneto-resistance unit placed in said fixed magnetic field and coupled to said rotatable body, said magneto-resistance unit including four magneto-resistance elements each having a resistance value variable with the direction of said magnetic field due to rotation of said rotatable body, each of said magneto-resistance elements being connected in each arm of a bridge circuit, one pair of opposing junctions of said bridge circuit being connected across an electrical power source to form a pair of current paths and the other pair of opposing junctions being connected to respective output terminals, one pair of diagonally opposing arms in said pair of current paths further including respectively fixed resistors having substantially the same resistance value to unbalance output voltages developed at said output terminals such that a value of one of said output voltages having a sinusoidal waveform is above or at least equal to a value of the other of said output voltages having a sinusoidal waveform and being 90° out of phase with said first-mentioned output voltage; and a direct current amplifier circuit from amplifying a voltage difference between the output voltages at the output terminals of said magneto-resistance unit.

* * * * *